(12) United States Patent
Zhou et al.

(10) Patent No.: US 8,969,489 B2
(45) Date of Patent: Mar. 3, 2015

(54) THERMOSETTING COATING COMPOSITION

(75) Inventors: Jianhui Zhou, Kingsport, TN (US); Angela Jones Johnson, Blountville, TN (US)

(73) Assignee: Eastman Chemical Company, Kingsport, TN (US)

( * ) Notice: Subject to any disclaimer, the term of this patent is extended or adjusted under 35 U.S.C. 154(b) by 237 days.

(21) Appl. No.: 13/205,152

(22) Filed: Aug. 8, 2011

(65) Prior Publication Data

US 2012/0041143 A1 Feb. 16, 2012

Related U.S. Application Data

(60) Provisional application No. 61/372,275, filed on Aug. 10, 2010.

(51) Int. Cl.

| *C09D 169/00* | (2006.01) |
| *C08G 64/02* | (2006.01) |
| *H01S 3/097* | (2006.01) |
| *C08G 64/30* | (2006.01) |
| *C08K 5/29* | (2006.01) |
| *C08K 5/3492* | (2006.01) |

(52) U.S. Cl.
CPC ............ *H01S 3/097* (2013.01); *C08G 64/0208* (2013.01); *C08G 64/305* (2013.01); *C08K 5/29* (2013.01); *C08K 5/34922* (2013.01); *C08K 5/34924* (2013.01); *C09D 169/00* (2013.01)
USPC ............. 525/467; 528/85; 528/254; 528/370; 528/371

(58) Field of Classification Search
None
See application file for complete search history.

(56) References Cited

U.S. PATENT DOCUMENTS

| 3,428,600 | A | | 2/1969 | Sullivan et al. | |
| 3,544,657 | A | * | 12/1970 | Schutze et al. | ............... 525/509 |
| 5,171,830 | A | | 12/1992 | Grey | |
| 5,439,988 | A | | 8/1995 | Moens et al. | |
| 6,037,436 | A | * | 3/2000 | Walker et al. | ............... 528/196 |
| 6,255,437 | B1 | | 7/2001 | Walker et al. | |
| 7,649,074 | B2 | | 1/2010 | Bruchmann et al. | |

FOREIGN PATENT DOCUMENTS

| WO | WO-2009/012391 | * | 1/2009 |
| WO | WO 2010/090715 A1 | | 8/2010 |

OTHER PUBLICATIONS

Notification of Transmittal of The International Search Report and the Written Opinion of the International Searching Authority, or the Declaration, International application No. PCT/US2011/047042 with a mailing date of Nov. 11, 2011.

* cited by examiner

*Primary Examiner* — David Buttner
(74) *Attorney, Agent, or Firm* — Dennis V. Carmen

(57) ABSTRACT

The invention is a thermosetting coating composition comprised of an aliphatic polycarbonate resin and a cross linker. The aliphatic polycarbonate resins are derived from hydroxyl containing compounds including 2,2,4,4-tetramethyl-1,3-cyclobutanediol (TMCD) and 1,4-cyclohexane dimethanol (CHDM). The coatings made of these polycarbonates exhibit exceptional toughness; they possess a high degree of hardness while maintaining a high level of flexibility/impact resistance. These polycarbonate resins also exhibited better hydrolytic stability as compared to their polyester counterparts.

17 Claims, 5 Drawing Sheets

US 8,969,489 B2

THERMOSETTING COATING COMPOSITION

CROSS REFERENCES TO RELATED APPLICATION

This application claims the benefit of U.S. Provisional Application Ser. No. 61/372,275 filed Aug. 10, 2010.

FIELD OF INVENTION

The present invention relates to thermosetting liquid coating compositions for applications that require good chemical resistance, flexibility, weatherability and hydrolytic stability.

BACKGROUND OF THE INVENTION

Thermosetting protective coatings are widely used in original equipment manufacturer (OEM) and industrial maintenance fields. Thermosetting acrylics are known to exhibit excellent light stability and hydrolysis resistance in general. There is broad latitude in terms of property adjustment with acrylics that can be fine tuned to fit many particular applications. Acrylics have the capability to provide many desirable characteristics such as increased hardness; fast dry time; stain resistance and excellent outdoor durability. Consequently, thermosetting acrylics are used as primary film-forming resins in coatings for transportation, industrial maintenance, and marine coatings.

Although thermosetting acrylics exhibit many desirable properties, they often lack flexibility and chemical resistance. These are crucial properties required in many applications including coil coatings, train/container and other coatings. Thermosetting polyesters are the primary film-forming resins in these fields due to their excellent flexibility and chemical resistance as compared to thermosetting acrylics. Thermosetting polyesters are also know to have a relatively lower viscosity and can produce lower VOC coatings. One shortfall with polyester resins is their hydrolytic stability. Because ester linkages in the polyester backbone are susceptible to attack by water molecules, polyester based coatings are not suitable for objects that are often exposed to high humidity or that come into contact with water. Hydrolytic stability also plays an important role in the durability of the coatings.

Accordingly, it is desirable to have a polymer coating material that is hydrolytically stable and possesses excellent flexibility and chemical resistance.

This invention describes a thermosetting coating composition comprised of at least an aliphatic polycarbonate resin and a cross linker. The aliphatic polycarbonate resins described in this invention are derived from hydroxyl containing compounds including 2,2,4,4-tetramethyl-1,3-cyclobutanediol (TMCD) and 1,4-cyclohexane dimethanol (CHDM). The coatings made of these polycarbonates exhibit exceptional toughness. They possess a high degree of hardness while maintaining a high level of flexibility/impact resistance. These polycarbonates resins also exhibited better hydrolytic stability as compared to their polyester counterparts.

SUMMARY OF THE INVENTION

The invention relates to a thermosetting coating composition comprised of an aliphatic polycarbonate resin and a cross linker. The aliphatic polycarbonate resins are derived from hydroxyl containing compounds including 2,2,4,4-tetramethyl-1,3-cyclobutanediol (TMCD) and 1,4-cyclohexane dimethanol (CHDM). The coatings made up of these polycarbonates exhibit exceptional toughness, and they possess a high degree of hardness while maintaining a high level of flexibility/impact resistance. These aliphatic polycarbonate resins also exhibited better hydrolytic stability when compared to their polyester counterparts.

DETAILED DESCRIPTION OF THE INVENTION

Figure 1:
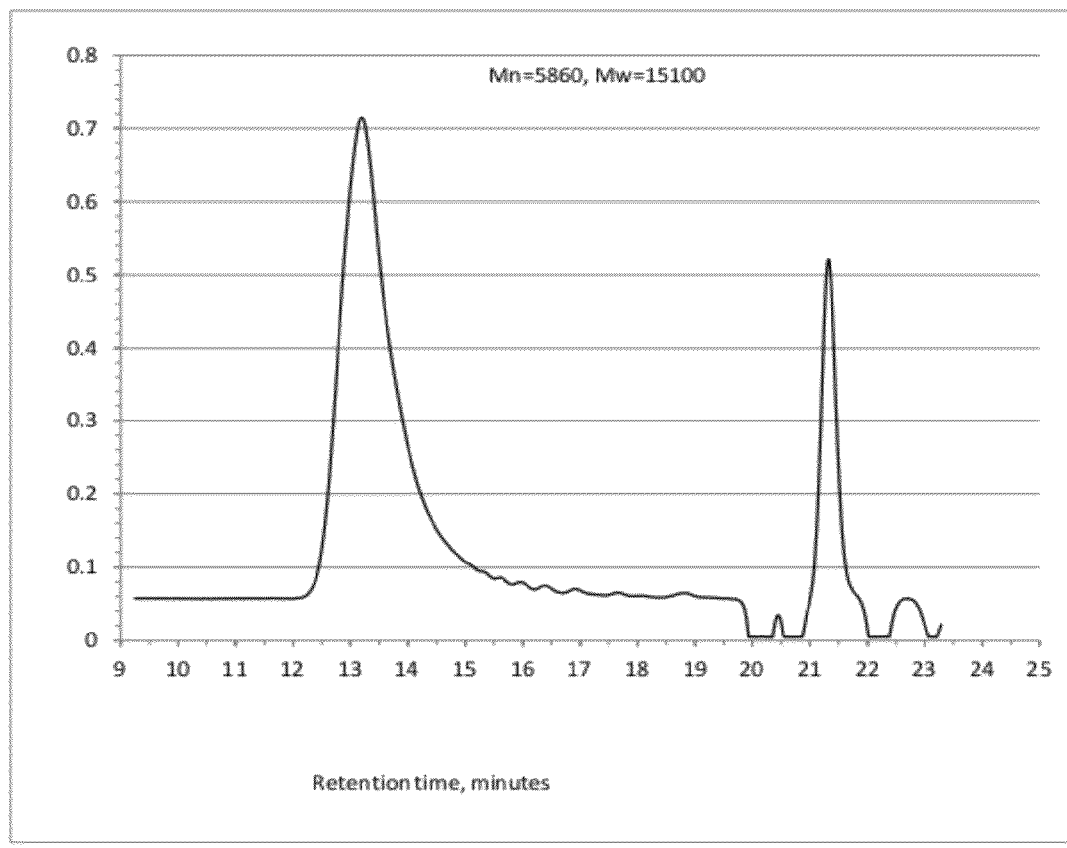
FIG. 1 illustrates the GPC analysis of Example 1.

Before the present compositions of matter and methods are disclosed and described, it is to be understood that this invention is not limited to specific methods or to particular formulations, except as indicated, and as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains to the extent they do not contradict the statements made herein.

This invention provides a thermosetting coating composition comprised of at least an aliphatic polycarbonate resin and a cross linker. The aliphatic polycarbonate resins described in this invention are derived from hydroxyl containing compounds including 2,2,4,4-tetramethyl-1,3-cyclobutanediol (TMCD) and 1,4-cyclohexane dimethanol (CHDM). The coatings made of these polycarbonates exhibit exceptional toughness. They possess a high degree of hardness while maintaining a high level of flexibility/impact resistance. These polycarbonate resins also exhibited better hydrolytic stability than their polyester counterparts.

One embodiment of the present invention provides a thermosetting polymer material that can be dissolved in a common solvent or solvent mixture. The thermosetting polymer material is an aliphatic polycarbonate that contains at least one hydroxyl group that can be reacted with one or more crosslinking agents to form liquid thermosetting coatings. The thermosetting coatings provided in the present invention possess excellent chemical resistance, flexibility and improved hydrolytic stability. In one aspect of the present invention, the aliphatic polycarbonate is a copolymer comprised of recurring units, respectively, of the formula:

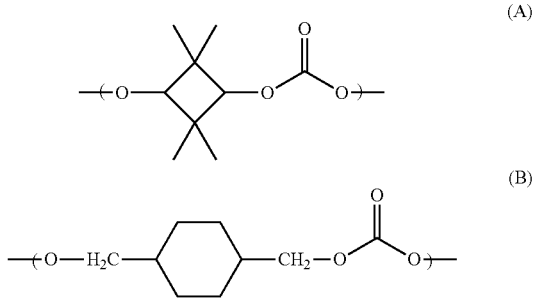

The molar ratio of unit (A) to unit (B) is in the range of about 9:1 to about 1:9. It was found that the thermosetting coatings comprised of copolycarbonate polymer containing both repeat units (A) and (B) possessed exceptional hardness, while still maintaining very good flexibility and impact resistance.

The copolycarbonate according to the present invention may further be comprised of a third aliphatic diol.

The maximum amount of the third diol component depends on the type of compound. It can be up to about 50 mole % based on total hydroxyl containing molecules including TMCD and CHDM. Examples of the suitable aliphatic diol component in combination with TMCD and CHDM include, but are not limited to, neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-butyl-2-ethyl-1,3-propanediol, 2-ethyl-2-isobutyl-1,3-propanediol, 1,2-butanediol, 1,3-butanediol, 1,4-butanediol, 1,5-pentanediol, 1,6-hexanediol, 1,2-cyclohexanediol, 1,4-cyclohexanediol, 2-ethyl-1,3-hexanediol, 2,2,4,4-tetramethyl-1,6-hexanediol, thiodiethanol, 2,2,4-trimethyl 1,3-pentanediol, 2,4-diethyl-1,5-pentanediol, norbornene dimethanol, hydroxypivalyl hydroxypivalate, 1,10-decanediol and hydrogenated bisphenol A. For example, in one embodiment, 2-butyl-2-ethyl-1,3-propanediol (BEPD) can be used as an optional diol in combination with TMCD and CHDM. In the present invention, the copolycarbonate may be a polyfunctional copolycarbonate in which a third diol component is comprised of a compound having at least three hydroxyl groups per molecule. The branching units can increase the overall final crosslink density; thereby improving the toughness and chemical resistance of the cured thermosetting coatings. Examples of such branching agents include, but are not limited to, trimethylolethane, trimethylolpropane, hexanetriol, pentaerythritol, 1,2,4-cyclohexanetrimethanol, 1,3,5-cyclohexanetrimethynol and 1,2,4,5-cyclohexanetetramethanol.

In some instances, when the amount of a compound having at least three hydroxyl groups is too large, crosslinking and gelation are likely to occur during the synthesis process. Therefore, in some embodiments, the amount of the compound having at least three hydroxyl groups should be up to about 20 mole %, based on the total hydroxyls containing components used in the synthesis of copolycarbonate polymer.

The aliphatic polycarbonate according to the present invention is an amorphous solid or viscous liquid at about 25° C., which can be dissolved in a common solvent such as butyl acetate and aromatic 100 easily. If the structural units of a copolycarbonate are comprised only of the units (A) and (B), the copolycarbonate is amorphous when the molar ratio of units (A) to units (B) is in the range of about 8:2 to about 3:7. When the molar ratio is outside this range, the final copolycarbonate polymer tends to form a crystalline structure and is either insoluble in a common solvent or forms a cloudy/hazy solution due to crystallization. It is possible to expand the molar ratio of units (A) to units (B) from about 9:1 to about 1:9 while still maintaining the amorphous status of the aliphatic polycarbonate if a third aliphatic hydroxyl component is added of a type and in an amount sufficient to retain the clarity of the solution.

The aliphatic polycarbonate described herein may be prepared by performing an ester exchange between a dialkyl or alkylene carbonate and a mixture of aliphatic hydroxyl compounds, e.g., TMCD, CHDM and other selected hydroxyl containing compounds, in the presence of a catalyst customarily employed for an ester exchange reaction. The reaction may be performed by melt, interfacial or solution polymerizations, as known in the art. In one embodiment, melt polymerization is the process used for carrying out the ester exchange reaction.

The reaction may occur at conventional temperatures known in the art for ester exchange reactions. For example, in one embodiment, a reaction temperature from about 80° C. to about 220° C. can be used. In one embodiment, a temperature close to of the boiling point of dialkyl carbonate is employed during the initial stage of the reaction, and as the reaction proceeds, the temperature is gradually increased.

A reaction vessel having a distillation column is usually employed to enable the separation of the dicarbonate employed as the starting material and the alcohol which is a by-product of the reaction.

In the event that a part of the dialkyl carbonate is lost by azeotrope with the alcohol which is removed by distillation, it is advisable to take the amount of any such possible loss of dialkyl carbonate into consideration when weighing the starting materials to be charged into the reaction system.

Although the reaction may be performed at normal pressure, its progress can be promoted if a reduced pressure in the range of 1 to 10 torr is employed during the later stage of the polymerization. The molecular weight of the aliphatic polycarbonate polymer can be adjusted by changing the molar ratio of the hydroxyl containing compounds and the dialkyl or dialkylene carbonate. The appropriate molecular weight range of the copolycarbonate according to the present invention depends on the use of the final polymer. Generally, the copolycarbonate can have a number average molecular weight of from about 300 to about 50,000. For example, the number average molecular weight may be from about 600 to about 20,000. The molecular weight is generally measured by a conventional gel permeation chromatography method or a conventional terminal group determination method.

Examples of suitable dialkyl carbonates include, but are not limited to, dimethyl carbonate, diethyl carbonate, propyl carbonate and dibutyl carbonate.

Examples of suitable alkylene carbonates include, but are not limited to, ethylene carbonate, 1,2-propylene carbonate and 1,2-butylene carbonate.

Examples of suitable catalysts used to obtain the aliphatic polycarbonate include, but are not limited to, alkali metals such as lithium, sodium, potassium, rubidium, cesium, magnesium, calcium, strontium, barium, zinc, aluminum, titanium, cobalt, germanium, tin, lead, antimony, arsenic and alkali metal hydroxides or alkali metal alkoxides. Other examples of catalysts include alkali and alkaline earth metal carbonates, zinc borate, zinc oxide, lead silicate, lead carbonate, antimony trioxide, germanium dioxide, cerium trioxide, and aluminum isopropoxide.

The amount of catalyst is at least 0.0001 wt. %, or at least 0.001 wt. %, or at least 0.005 wt. %, or at least 0.01 wt. %, and up to 0.03 wt. %, or up to 0.025 wt. %, or up to 0.02 wt. %, or up to 0.015 wt. %, or up to 0.01 wt. %. Further examples of suitable amounts of catalyst include a range of from 0.0001 wt. % to 0.03 wt %, or 0.0001 wt. % to 0.025 wt. %, or 0.0001 wt. % to 0.02 wt. %, or 0.001 wt. % to 0.03 wt %, or 0.001 to 0.025 wt. %, or 0.001 to 0.02 wt. %, or 0.005 wt. % to 0.03 wt %, or 0.005 wt. % to 0.025 wt. %, or 0.005 to 0.02 wt. %. In each case, the weight percentages are based on the total weight of the aliphatic hydroxyl compounds employed. Lower catalyst concentration will reduce reaction speed and leads to a long cycle time. Use of excess catalyst not only leads to a relatively low yield, low molecular weight polymer with a wider molecular weight distribution, but also to a increased rates of hydrolysis and less than acceptable heat aging performance of final coating compositions if the remaining catalyst is not deactivated and removed. Removal of excess catalyst is a time consuming process and will reduce the economical value of the invention. Generally, in the present invention, removal of excess catalyst is not required.

The liquid thermosetting coating composition of the present invention is comprised of an aliphatic polycarbonate resin containing TMCD and CHDM, a crosslinker, organic solvents and a catalyst. The coating may further comprise additives and pigments commonly used in coating formulations. Optionally, other hydroxyl bearing resins, such as acrylic polyols and polyester polyols can be used as "blending" resins. Suitably, the content of these blending resins can be at a level that does not adversely affect the properties of the present invention.

In one embodiment, the crosslinkers react with a hydroxyl-terminated polycarbonate resin. For example, suitable crosslinkers include, but are not limited to, melamines and isocyanates (isocyanurates).

Melamine or "amino" type crosslinkers are well-known in the art and include, but are not limited to, hexamethoxymethylmelamine, tetramethoxymethylbenzoguanamine, tetramethoxymethylurea, mixed butoxy/methoxy substituted melamines, and the like. Examples of these malamines include the Cymel 300 series and Cymel 1100 series melamine crosslinkers from Cytec Surface Specialties.

Many isocyanates and isocyanurates are useful as crosslinkers according to the present invention. Suitable isocyanates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, and polyisocyanates. Isocyanate terminated adducts of diols and polyols, such as ethylene glycol, 1,4-butylene glycol, trimethylol propane, etc can also be employed. These are formed by reacting more than one equivalent of a diisocyanate, such as those mentioned, with one equivalent of a diol or polyol to form a higher molecular weight isocyanate prepolymer with a functionality of 2 or higher. Examples include those isocyanate crosslinkers under the Desmodur and Mondur trade names from Bayer MateriaIScience and those under the Tolonate trade name from Perstorp.

In one embodiment, when melamines are used as crosslinkers, the proper weight ratio of aliphatic polycarbonates and other hydroxyl bearing blending resins, if any, to melamine crosslinkers can be determined. Depending on each component's equivalent weight and required properties, the proper ratios can range from about 60:40 to about 95:5 or from about 70:30 to about 90:10.

The catalysts for the hydroxyl and melamine reactions are well known in the art. Suitable catalysts include, but are not limited to, p-toluenesulfonic acid, dodecylbenzene sulfonic (DDBSA) unblocked and blocked, dinonylnaphthalene sulfonic acid (DNNSA) and dinonylnaphthalene disulfonic acid (DNNDSA) such as Nacure 155, 5076, 1051, and 5225 catalysts sold by King Industries, BYK-Catalysts sold by BYK-Chemie USA and Cycat catalysts sold by Cytec Surface Specialties.

In one embodiment, aliphatic isocyanates can be used as crosslinkers. When aliphatic isocyanates are used they provide improved outdoor durability and color stability in the cured coatings.

Suitable stoichiometric calculations for the aliphatic polycarbonate resins and isocyanates are known to those skilled in the art. For example, in one embodiment, thermosetting coating composition can have an NCO to OH ratio from about 0.9/1.0 to about 1.5/1.0 or from about 0.95/1.0 to about 1.25:1.0. The possible catalysts for this crosslinking reaction include organic tin based compounds such as dibutyltindilaurate (DBTDL) and dibutyltindiacetate, non-tin based catalysts and tertiary amines.

The thermosetting liquid coating compositions may include various additives ordinarily incorporated in compositions of this type. Examples of additional additives include, but are not limited to, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations including one or more of the foregoing additives.

In the present invention, the thermosetting liquid coating compositions can be un-pigmented transparent clear coats, or pigmented systems for primer, basecoat and topcoat applications. The pigment may be any typical organic or inorganic pigment. Several different pigments may be needed to achieve a desirable color for a particular application. Examples of suitable pigments include, but are not limited to, titanium dioxide, barytes, clay, calcium carbonate, red iron oxide, CI Pigment Yellow 42, CI Pigment Blue 15, 15:1, 15:2, 15:3, 15:4 (copper phthalocyanines), CI Pigment Red 49:1, CI Pigment Red 57:1 and carbon black.

The resulting thermosetting coating compositions can be applied onto a substrate using techniques known in the art; e.g. by spraying, draw-down, roll-coating. Examples of substrates that may be coated include, but are not limited to, plastics, wood, metals such as aluminum, steel or galvanized sheeting, concrete, glass, composites, urethane elastomers, primed (painted) substrates, and the like. The coatings can be cured at room temperature or at an elevated temperature in a forced air oven or with other types of heating sources.

The following examples are given to illustrate the invention and to enable any person skilled in the art to make and use the invention. It should be understood, however, that the invention is not to be limited to the specific conditions or details described in these examples.

EXAMPLES

Synthesis Example 1

TMCD:CHDM=50:50 (molar ratio), catalyst used was sodium methoxide and the catalyst concentration to total diols was 0.0122 wt % or 122 ppm.

The resins were prepared in a two-liter reaction kettle equipped with a heating mantle, mechanical stirrer, thermocouple, nitrogen purge, and a packing filled distillation column. The flask was charged with 2,2,4,4-tetramethyl-1,3-cyclobutanediol (TMCD: 108.2 g, 0.75 mol), 1,4-cyclohexane dimethanol (CHDM: 108.2 g, 0.75 mol), diethyl carbonate (DEC: 118.1 g, 1.0 mol) and sodium methoxyide (0.5N solution in methanol: 0.84 g). The reactor was purged with nitrogen for 5 minutes, and then heated until reflux appeared, which was around 140° C., with agitation. The reaction was performed at normal pressure with diethyl carbonate being boiled. As the reaction progressed there was a reduction in the temperature of the reaction mixture, because of the ensuing evaporative cooling of the ethanol released. The resulting ethanol was removed through the distillation column. The reaction continued for two hours while maintaining the reflux and removing the ethanol. Then an additional 59.3 g of diethyl carbonate was dropped into the kettle over a one hour period. Along with the progression of the reaction, the free diethyl carbonate in the kettle was decreasing and the temperature of the kettle was gradually increasing. When the temperature of the kettle reached 200° C., the temperature was held at 200° C. for 30 minutes, and then the distillation column was replaced with a vacuum distillation trap. The pressure of the kettle was gradually reduced (to prevent foaming or bumping) to below 10 torr at 200° C. and stirred for another 30 minutes, then the reactor was returned to atmospheric pressure via nitrogen and removed from the heating mantle. The reactor was weighed (for determination of yield) and a small sample was taken for Tg determination. The reactor was then returned to the heating mantle and a solvent mixture containing aromatic 100 and butyl acetate 85:15, was added to achieve a 60% solids uniform solution. The overall process took about 7 hours. The resulting polymer solution was a clear, viscous solution with a number average molecular weight of 5860 and a Tg of 48° C. GC analysis results showed that the distillation solution contained 9.1 wt % diethyl carbonate and 90.9 wt % ethanol. FIG. 1 illustrates the GPC peaks of Example 1.

Molecular weights were determined by gel permeation chromatography (GPC) using a refractive index detector with polystyrene standards. Tg was determined using differential scanning calorimetry (DSC) with a TA instrument Q2000 MDSC with Universal software V4.3A. On the first heating cycle, the sample was heated under a nitrogen atmosphere from −50° C. to 150° C. at a rate of 5° C./min. Next, it was cooled to −50° C. at 5° C./min, and then preceded to the second heat cycle. The same parameters were used in the second heating cycle. The midpoint detected by the second heating cycle is reported as the Tg of the sample.

Comparative Synthesis Example 1

TMCD:CHDM=50:50, catalyst used was sodium methoxide and the catalyst concentration to total diols was 0.558 wt % or 5580 ppm. This example is the same as example 1 except the catalyst level was 46 times higher.

Figure 2:
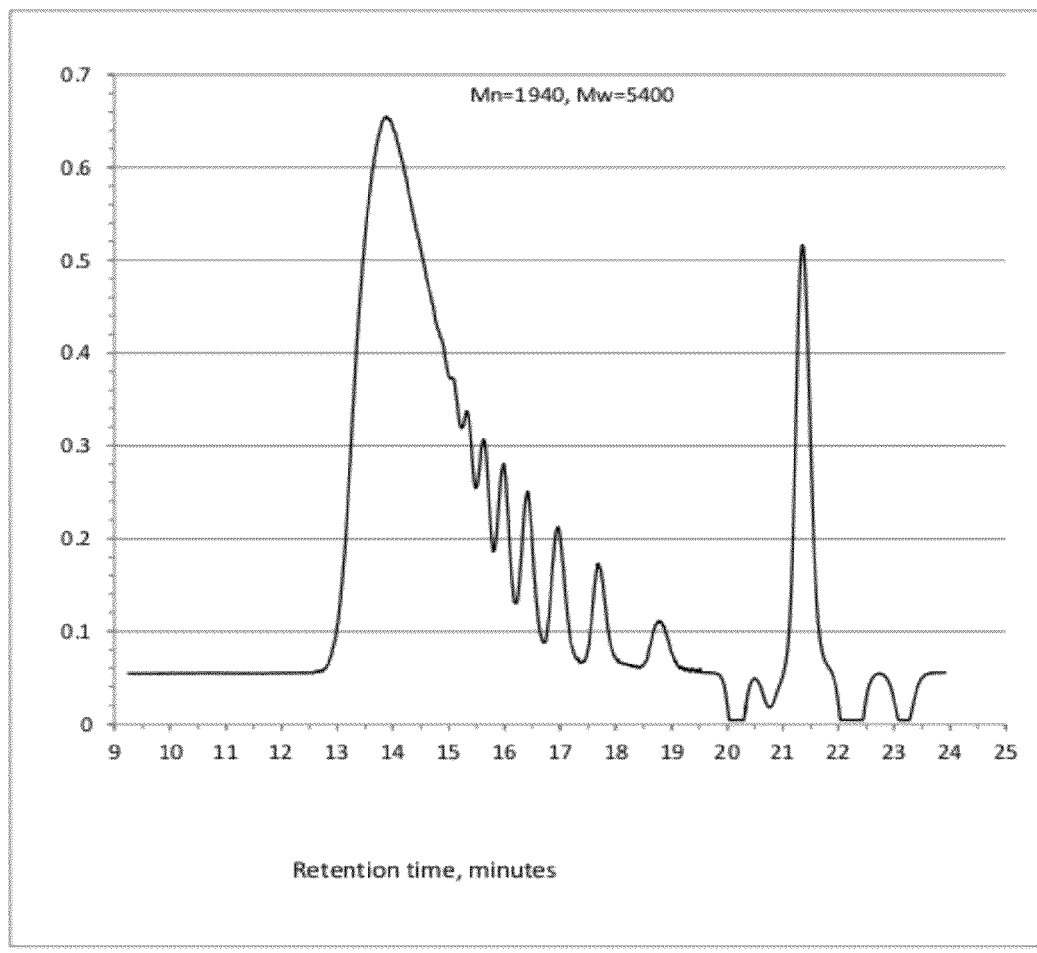
FIG. 2 illustrates the GPC analysis of Comparative Example 1.

The initial and additional charges were listed in Table 1. The same procedure as example 1 was followed. The reaction speed was faster than example 1 due to the higher catalyst concentration. The total process took about five hours. However, during the vacuum process it was noted that there were white solids around the wall of the column and the other vacuum fixtures. GC analysis revealed that the white solids were low molecular weight oligomers including TMCD and TMCD monocarbonate. GC results also showed that there were low molecular weight oligomers in the solution cached in the vacuum trap along with ethanol and diethyl carbonate. GPC analysis of the resulting polymer, is illustrated in FIG. 2, showed that there were many low molecular weight oligomer peaks as shown in the GPC chart below. The resulting polymer had a number average molecular weight of 1940 and a Tg of 32° C.

Synthesis Example 2

TMCD:CHDM=41:59, dimethyl carbonate (DMC) was used instead of diethyl carbonate. Potassium hydroxide was used as catalyst and the catalyst concentration to total diols was 0.0122% or 122 ppm.

The reaction was carried out using a two stage reaction process, e.g. first DMC was reacted with TMCD, in which the hydroxyl groups were secondary, and then CHDM was introduced.

The resins were prepared in a two-liter reaction kettle equipped with a heating mantle, mechanical stirrer, thermocouple, nitrogen purge, and a packing filled distillation column. The flask was charged with TMCD (144.2 g, 1.0 mol), dimethyl carbonate (DMC: 225.2 g, 2.5 mol) and potassium hydroxide (0.5N solution in methanol: 1.3 g). The reactor was purged with nitrogen for 5 minutes, and then heated until reflux appeared, which was around 94° C., with agitation. The reaction was performed at normal pressure with dimethyl carbonate being boiled. As the reaction progressed there was a reduction in the temperature of the reaction mixture, because of the ensuing evaporative cooling of the methanol released. The resulting methanol was removed through the distillation column. The reaction was continued for about three hours until the distillation of methanol stopped, then the reactor was cooled down to 90° C. and CHDM (209.2 g, 1.45 mol) was introduced. The temperature was increased until reflux appeared (about 122° C.) while maintaining the agitation and removing the ethanol. After one hour, an additional 74.8 g of dimethyl carbonate was dropped into the kettle over a one hour period. Along with the progression of the reaction, the free dimethyl carbonate in the kettle was decreasing and the temperature of the kettle was gradually increasing. When the temperature of the kettle reached 200° C., the temperature was held at 200° C. for 30 minutes, and then the distillation column was replaced with a vacuum distillation trap. The pressure of the kettle was gradually reduced (to prevent foaming or bumping) to below 10 torr at 200° C. and stirred for another 30 minutes, then the reactor was returned to atmospheric pressure via nitrogen and removed from the heating mantle. The reactor was weighed (for determination of yield); a small sample was taken for Tg determination. The reactor was returned to the heating mantle and then a solvent mixture containing aromatic 100 and butyl acetate 85:15, was added to achieve a 60 wt % solids uniform solution. The overall process took about 9 hours. The resulting polymer solution was a clear, viscous solution with a number average molecular weight of 6020 and a Tg of 47° C. GC results showed that the distillation solution contained 38.5 wt % DMC and 61.5 wt % methanol.

Synthesis Example 3

TMCD:CHDM=41:59, dimethyl carbonate was used instead of diethyl carbonate (DMC). Potassium hydroxide was used as catalyst and the catalyst concentration to total diols was 0.0122 wt % or 122 ppm.

This example was similar in formula to example 2, but used a one stage reaction process instead of two stage reaction as shown in synthesis example 2.

The resins were prepared in a two-liter reaction kettle equipped with a heating mantle, mechanical stirrer, thermocouple, nitrogen purge, and a packing filled distillation column. The flask was charged with TMCD (144.2 g, 1.0 mol), CHDM (209.2 g, 1.45 mol), DMC (90.1 g, 1.0 mol) and potassium hydroxide (0.5N solution in methanol: 1.3 g). The reactor was purged with nitrogen for 5 minutes, and then heated until reflux appeared, which was around 110° C., with agitation. The reaction was performed at normal pressure with dimethyl carbonate being boiled. The reaction was continued for one hour while maintaining the reflux and removing the ethanol. At this point, an additional 210 g of dimethyl carbonate was dropped into the kettle over a two hour period. Along with the progression of the reaction, the free dimethyl carbonate in the kettle was decreasing and the temperature of the kettle was gradually increasing. When the temperature of the kettle reached 200° C., the temperature was held at 200° C. for 30 minutes, and then the distillation column was replaced with a vacuum distillation trap. The pressure of the kettle was gradually reduced (to prevent foaming or bumping) to below 10 torr at 200° C. and stirred for another 30 minutes, then the reactor was returned to atmospheric pressure via nitrogen and removed from the heating mantle. The reactor was weighed (for determination of yield); a small sample was taken for Tg determination. The reactor was returned to the heating mantle and then a solvent mixture containing aromatic 100 and butyl acetate 85:15 was added to achieve a 60 wt % solids uniform solution. The resulting polymer solution was a clear, viscous solution with a number average molecular weight of 6860 and a Tg of 47° C.

Synthesis Example 4

TMCD:CHDM:TMP=46.5:46.5:7.0

The same equipment and procedure as for example 2 was used. The initial charges to the kettle were TMCD (144.2 g, 1.0 mol), DMC (225.2 g, 2.5 mol) and potassium hydroxide (0.5N solution in methanol: 1.2 g). The second charge included CHDM (144.2 g, 1.0 mol), trimethylolpropane (TMP: 20.1 g, 0.15 mol) and the additional DMC dropped in over one hour was 34.4 g.

The resulting polymer was a branched polycarbonate polyol with a number molecular weight of 3600 and a Tg of 43° C.

Synthesis Example 5

TMCD:CHDM:BEPD=41:45:14

The same equipment and procedure as for example 3 was used. The initial charges to the kettle were TMCD (144.2 g, 1.0 mol), CHDM (158.6 g, 1.1 mol), 2-butyl-2-ethyl-1,3-propanediol (BEPD: 56.1 g, 0.35 mol), DMC (180.2 g, 2.0 mol) and potassium hydroxide (0.5N solution in methanol: 2.7 g). The additional DMC dropped over a two hour period was 134.8 grams. The resulting polymer solution was a clear, viscous solution with a number average molecular weight of 5400 and a Tg of 25° C.

Synthesis Example 6

TMCD:CHDM:BEPD:TMP=37.5:45.8:10.4:6.3

The same equipment and procedure as for example 3 was used. The initial charges to the kettle were TMCD (129.8 g, 0.9 mol), CHDM (158.6 g, 1.1 mol), TMP (20.1 g, 0.15 mol), 2-butyl-2-ethyl-1,3-propanediol (BEPD: 40.1 g, 0.25 mol), DMC (180.2 g, 2.0 mol) and potassium hydroxide (0.5N solution in methanol: 2.7 g). The additional DMC dropped over a two hour period was 134.8 grams. The resulting polymer was a branched polycarbonate polyol. The polymer solution was a clear, viscous solution with a number average molecular weight of 5480 and a Tg of 31° C.

Comparative synthesis examples 2 and 3 blow illustrate that the molar ratio of unit A (TMCD derivative) and unit B (CHDM derivative) within certain range is important. When this ratio beyond certain range, the product either is insoluble in common solvent or forms cloudy solution.

Comparative Synthesis Example 2

TMCD:CHDM:TMP=18.7:75.0:6.3

The same equipment and procedure as for example 3 was used. The initial charges to the kettle were TMCD (64.9 g, 0.45 mol), CHDM (259.6 g, 1.8 mol), TMP (20.1 g, 0.15 mol), DMC (180.2 g, 2.0 mol) and potassium hydroxide (0.5N solution in methanol: 1.3 g). The additional DMC dropped over a two hour period was 122.8 grams. The resulting polymer was a branched polycarbonate polyol. The polymer solution was clear initially. Over a two month period of time at ambient conditions, it gradually became cloudy and eventually became a wax like gel. The polymer had a number average molecular weight of 2370 and a Tg of 27° C.

Comparative Synthesis Example 3

TMCD:TMP=93.7:6.3

The same equipment and procedure as for example 3 was used. The initial charges to the kettle were TMCD (324.5 g, 2.25 mol), TMP (20.1 g, 0.15 mol), DMC (180.2 g, 2.0 mol) and potassium hydroxide (0.5N solution in methanol: 1.3 g). The additional DMC dropped in over a two hour period was 122.8 grams. The resulting polymer was a glass like solid once it cooled down and did not dissolve in a common solvent. While at melting conditions, it formed a uniform, clear solution in aromatic 100 and butyl acetate mixture. This solution became a hard wax after it cooled down. The polymer had a number average molecular weight of 5170 and a Tg of 82° C.

TABLE 1

| Polycarbonate formula | Ex. 1 | Comp. Ex. 1 | Ex. 2 | Ex. 3 | Ex. 4 | Ex. 5 | Ex. 6 | Comp. Ex. 2 | Comp. Ex. 3 |
|---|---|---|---|---|---|---|---|---|---|
| Aliphatic Polycarbonate synthesis examples 1 to 6 and comparative examples 1 to 3 | | | | | | | | | |
| Initial charge (gram) | | | | | | | | | |
| DEC | 118.1 | 118.1 | | | | | | | |
| DMC | | | 225.2 | 90 | 225.2 | 180.2 | 180.2 | 180.2 | 180.2 |

TABLE 1-continued

Aliphatic Polycarbonate synthesis examples 1 to 6 and comparative examples 1 to 3

| Poly-carbonate formula | Ex. 1 | Comp. Ex. 1 | Ex. 2 | Ex. 3 | Ex. 4 | Ex. 5 | Ex. 6 | Comp. Ex. 2 | Comp. Ex. 3 |
|---|---|---|---|---|---|---|---|---|---|
| TMCD | 108.2 | 108.2 | 144.2 | 144.2 | 144.2 | 144.2 | 129.8 | 64.9 | 324.5 |
| CHDM | 108.2 | 108.2 |  | 209.2 |  | 158.6 | 158.6 | 259.6 | 0 |
| TMP |  |  |  |  |  | 56.1 | 20.1 | 20.1 | 20.1 |
| BEPD |  |  |  |  |  |  | 40.1 |  |  |
| NaOCH₃ | 122 ppm | 5580 ppm |  |  |  |  |  |  |  |
| KOH |  |  | 122 ppm | 122 ppm | 122 ppm | 244 ppm | 244 ppm | 122 ppm | 122 ppm |
| Second stage (gram) | | | | | | | | | |
| CHDM |  |  | 209.2 |  | 144.2 |  |  |  |  |
| TMP |  |  |  |  | 20.1 |  |  |  |  |
| Subsequent additions (gram) | | | | | | | | | |
| DEC | 59.3 | 59.3 |  |  |  |  |  |  |  |
| DMC |  |  | 74.8 | 210 | 34.4 | 134.8 | 134.8 | 122.8 | 122.8 |
| Molecular weight and Tg | | | | | | | | | |
| Mn | 5860 | 1940 | 6020 | 6860 | 3600 | 5400 | 5480 | 2370 | 5170 |
| Mw | 15100 | 5400 | 16600 | 15780 | 10400 | 13000 | 24000 | 6160 | 20400 |
| Tg °C. | 48 | 32 | 47 | 47 | 43 | 25 | 31 | 27 | 82 |
| Appearance | | | | | | | | | |
|  | Clear, transparent solution | Clear, transparent solution | Clear, transparent solution | Clear, transparent solution | Clear, transparent solution | Clear, transparent solution | Clear, transparent solution | Cloudy solution | Insoluble, solid |

DEC—Diethyl carbonate
DMC—Dimethyl carbonate
TMCD—2,2,4,4-tetramethyl-1,3-cyclobutanediol
CHDM—1,4-cyclohexane dimethanol
TMP—Trimethanol propane
BEPD—2-butyl-2-ethyl-1,3-propanediol Comparative Synthesis Examples 4 and 5

TMCD and Neopentyl Glycol Based Aliphatic Polyesters

Comparative example 4 is a neopentyl glycol based aliphatic polyester polyol and comparative example 5 is a TMCD based aliphatic polyester polyol. The compositions of these resins are listed in Table 2. The resins were made using a solvent process to help remove the water produced from the esterification. The resins were prepared in a two-liter reaction kettle equipped with a heating mantle, mechanical stirrer, thermocouple, nitrogen purge (0.6 scfh), oil-heated partial condenser (103° C.-105° C.), condensate trap, and water-cooled total condenser (15° C.). The condensate trap, kettle top and adapter from the kettle to the column were wrapped in aluminum foil and fiberglass tape to facilitate water removal. Stage 1 raw materials were charged to the reactor. Additional xylene (~30 g) was used to fill the condensate trap. The temperature was then increased from room temperature to 150° C. over ninety minutes to form a homogenous melt. Agitation (300 rpm) was started and the temperature increased to a maximum of 230° C. over 240 minutes.

The Stage 2

TMP was added when half the theoretical condensate was collected. The reaction mixture was held at 230° C. until a final acid number of 6±2 mg KOH/g resin was obtained. The resins were then poured into a metal paint can.

TABLE 2

Comparative aliphatic polyester examples 4 and 5

| Polyester formula | Comparative Example 4 | Comparative Example 5 |
|---|---|---|
| Stage 1 | | |
| NPG | 260.4 |  |
| TMCD |  | 357.2 |
| BEPD | 106.8 | 106.8 |
| AD | 97.4 | 97.4 |
| CADH | 222.9 | 222.9 |
| HHPA | 205.5 | 205.5 |
| Fastcat 4100 | 1.0 | 1.1 |
| Stage 2 | | |
| TMP | 22.4 | 22.4 |
| Determined resin properties | | |
| Mn | 3880 | 3300 |
| Mw | 14800 | 9700 |
| Tg °C. | 2 | 34 |

NPG—Neopentyl glycol
AD—Adipic acid
CHDA—1,4-cyclohexandicarboxylic acid
HHPA—hexahydrophthalic anhydride
Fastcat 4100—Butylstannoic acid (Arkema)

Thermosetting Coating Preparation and Evaluation
Coating Formulation Example 1—Clearcoat Thermosetting clear coats were prepared by mixing the ingredients listed in Table 3. The crosslinking agent used was Cymel 303, a melamine resin from Cytec. The melamine to polymer ratio was set at 20 to 80. A wire wound rod was used to apply the coating to polished cold rolled steel test panels with Bonderite 1000 pretreatment. Panels were purchased from ACT Test Panels LLC and have a thickness of 0.032 inch. The rod was selected to achieve a 0.5±0.1 mil dry film thickness. Coated panels were cured at 200° C. for 10 minutes.

MEK double rub solvent resistance test was performed with a 32 oz. ball peen hammer wrapped in 16 layers of cotton cheesecloth (ASTM D1308). The number passed was reported as the last rub until any breakthrough of the coating to metal was observed. The test was run to a maximum of 500 double rubs. Hardness was determined using two methods: a BYK-Gardner pendulum hardness tester (ASTM D 4366); and pencil test (ASTM D 3363). For pencil hardness, the value reported was the last pencil that did not cut through the coating to the metal substrate. Flexibility was measured as impact resistance with a Gardco Model 172 universal impact tester (ASTM D 2794). The values reported are the last impact that did not produce any cracks in the coating film or delamination of the coating from the substrate.

TABLE 3

Examples of thermosetting coating formulation and properties

| Coating Formulation | Example E1 | Example E2 | Comparative Example C1 | Comparative Example C2 |
|---|---|---|---|---|
| Resin (60 wt % in solvents) From synthesis example | Poly-carbonate from Example 2 | Poly-carbonate from Example 4 | Polyester from Comparative Example 4 | Polyester from Comparative Example 5 |
| | 133.3 | 133.3 | 133.3 | 133.3 |
| Aromatic-100 | 46.7 | 46.7 | 46.7 | 46.7 |
| Cymel 303 | 20 | 20 | 20 | 20 |
| Cycat 4040 | 1 | 1 | 1 | 1 |
| Total | 201 | 201 | 201 | 201 |
| Determined coating properties | | | | |
| MEK double rubs | >500 | >500 | 400 | >500 |
| Pencil hardness (Mitsubishi) | 4H | 4H | 1H | 2H |
| Konig hardness (OSC) | 152 | 157 | 52 | 144 |
| Konig hardness (Sec.)) | 186 | 206 | 78 | 200 |
| Impact resistance (lb.in) | | | | |
| Direct | >140 | >140 | >140 | >140 |
| Reverse | 100 | 80 | 120 | 100 |

Cymel 303—melamine crosslinking agent from Cytec Industries Inc.
Cycat 4040—catalyst from Cytec Industries Inc.

Hydrolysis Resistance Testing of the Coating Film

The cured films were tested for hydrolysis resistance in 80° C. water for four weeks. The pH value of the water was adjusted to 12-13 with a 20% sodium hydroxide solution. Hydrolysis resistance was judged by monitoring the tensile strength change.

Figure 3:
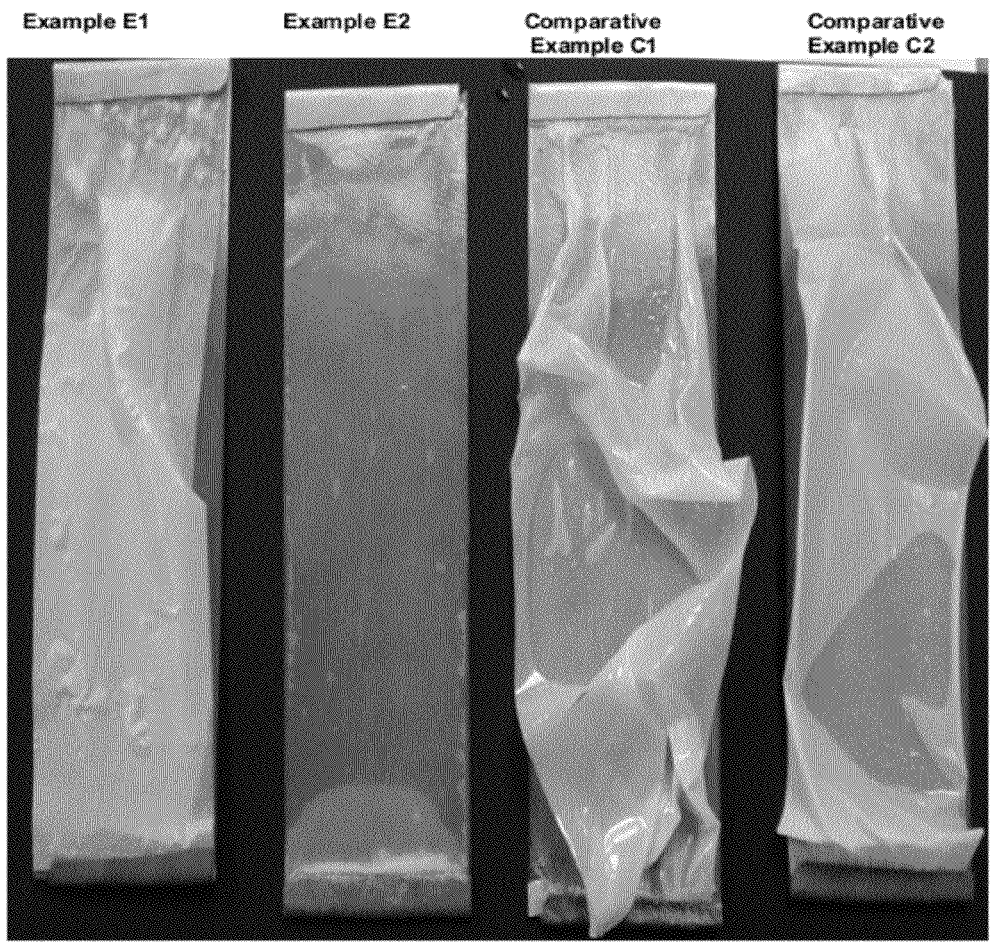
FIG. 3 illustrates insertion of film strips into stainless steel fixtures.

Clear films of coating examples E1, E2 and comparative coating examples C1 and C2 were prepared by drawing down the coatings onto Teflon coated pieces of aluminum foil using a wire wound rod. The rod was selected to achieve a 1.0±0.2 mil dry film thickness. Coated foils were then cured at 200° C. in an oven for 10 minutes. The cured films were carefully peeled off from the foils and then cut into 3×5 inch strips. The film strips were inserted in to specifically made stainless steel fixtures as shown in FIG. 3. The stainless fixture with film was immersed into a container filled with pH 12-13 DI water. The container was held at 80° C. in the oven. Each week, the pH of the water was checked and adjusted to 12-13 if needed; a set of four test strips for each coating was pulled out, rinsed with tap water and then dried for a week at ambient conditions. Tensile strength was measured with a D882 Film test from MTS Systems Corporation using the following parameters:

Gauge Length—2 inches; initial speed of 0.2 inches/min up to 1.6% strain followed by 2 inches/min up to break point. Table 4 shows the tensile strength measurement results. Each data point represents an average of four measurements.

TABLE 4

Film tensile strength change after hydrolysis testing

| | Initial | | 1 week | | 2 weeks | | 3 weeks | |
|---|---|---|---|---|---|---|---|---|
| | Break strain % | Break Stress Mpa | Break strain % | Break Stress Mpa | Break strain % | Break Stress Mpa | Break strain % | Break Stress Mpa |
| Example E1 | 3.84 | 47.27 | 3.45 | 27.76 | 3.29 | 36.55 | 2.80 | 22.54 |
| Example E2 | 1.72 | 26.31 | 2.49 | 36.49 | 2.44 | 39.66 | 1.85 | 27.14 |
| Comparative Example C1 | 86.24 | 24.57 | 43.53 | 5.15 | 97.00 | 8.91 | 90.80 | 6.91 |
| Comparative Example C2 | 3.84 | 46.79 | 2.02 | 30.63 | * | * | * | * |

* Dried film was too brittle to perform the tensile strength test

Two polycarbonate based coatings (E1 and E2) showed better hydrolysis resistance or tensile strength retention as compared to polyester based coatings (C1 and C2). FIG. 3 illustrates a picture taken after the film strips were immersed in 80° C. base water (pH=12-13) for four weeks. The branched polycarbonate based coating E2 almost kept its original shape. After drying, the film was transparent and maintained some degree of flexibility. The films of the two branched polyester based coatings were severely deformed. After drying, the films were cloudy and were so brittle, upon touch, they broke into many small pieces.

Coating Formulation Example 2—White Topcoat

White-pigmented thermosetting coatings were prepared based on the formulations listed in Table 5. The crosslinking agent used in the applications was Cymel 303, a melamine resin from Cytec. The melamine to polymer ratio was set at 20 to 80.

A Mini Motormill 250 from Eiger Machinery Inc. was used to grind Part A—mill base to a 7+ on a Hegman gage. Part B—the let down portion was pre-mixed in a container. After Part A cooled down, Part A and B were mixed until uniform. The viscosity of the mixed white topcoat was adjusted with aromatic 100 to a proper viscosity for drawdown application purposes. A wire wound rod was used to apply the coating to polished cold rolled steel test panels with Bonderite 1000 pretreatment. Panels were purchased from ACT Test Panels LLC and have a thickness of 0.032 inch. The rod was selected to achieve a 1.0±0.2 mil dry film thickness. Coated panels were cured at 200° C. for 10 minutes. Table 5 shows the coating formulations and determined properties.

TABLE 5

White-pigmented thermosetting coating formulations and determined properties

| White Topcoat Formulation | Example E3 | Example E4 | Comparative Example C3 | Comparative Example C4 |
|---|---|---|---|---|
| Resin (60 wt % in solvents) from synthesis example | Poly-carbonate from Example 2 | Poly-carbonate from Example 4 | Polyester from Comparative Example 4 | Polyester from Comparative Example 5 |
| Part A—Mill base | | | | |
| Resin | 241.2 | 241.2 | 241.2 | 241.2 |
| Aromatic-150 | 215.2 | 215.2 | 215.2 | 215.2 |

TABLE 5-continued

White-pigmented thermosetting coating formulations and determined properties

| White Topcoat Formulation | Example E3 | Example E4 | Comparative Example C3 | Comparative Example C4 |
|---|---|---|---|---|
| Disper BYK 110 | 10.7 | 10.7 | 10.7 | 10.7 |
| Aerosil 972 | 1.8 | 1.8 | 1.8 | 1.8 |
| Ti-Pure R960 TiO$_2$ | 266.6 | 266.6 | 266.6 | 266.6 |
| Part B—Let Down | | | | |
| Resin | 111.4 | 111.4 | 111.4 | 111.4 |
| CAB 551-0.01 (50% in MEK) | 8.9 | 8.9 | 8.9 | 8.9 |
| n-Butyl acetate | 88.9 | 88.9 | 88.9 | 88.9 |
| Cymel 303 | 52.9 | 52.9 | 52.9 | 52.9 |
| Cycat 4040 | 2.5 | 2.5 | 2.5 | 2.5 |
| Total | 1000.0 | 1000.0 | 1000.0 | 1000.0 |
| Pig./Binder ratio | 1.0 | 1.0 | 1.0 | 1.0 |
| Melamine/ resin ratio | 20:80 | 20:80 | 20:80 | 20:80 |
| Determined coating properties | | | | |
| MEK double rubs | >500 | >500 | >500 | >500 |
| Pencil hardness (Mitsubishi) | 4H | 4H | 1H | 2H |
| Konig hardness (OSC) | 123 | 130 | 47 | 117 |
| Konig hardness (Sec.)) | 173 | 184 | 66 | 166 |
| Impact resistance (lb.in) | | | | |
| Direct | >140 | >140 | >140 | >140 |
| Reverse | 100 | 50 | 120 | 50 |

Disper BYK 110—BYK Chemie USA Inc.
Aerosil 972—Degussa Corporation
Ti-Pure R960 TiO$_2$—DoPont Titanium Technologies
CAB 551-0.01—Eastman Chemical Company
Cymel 303—Cytec Industries Inc.
Cycat 4040—Cytec Industries Inc.

Test results showed that two coatings formulated with polycarbonate, Examples 2 and 4, possess great hardness while still maintaining comparable flexibility as compared to two coatings formulated with Comparative polyester examples 4 and 5.

Figure 4:
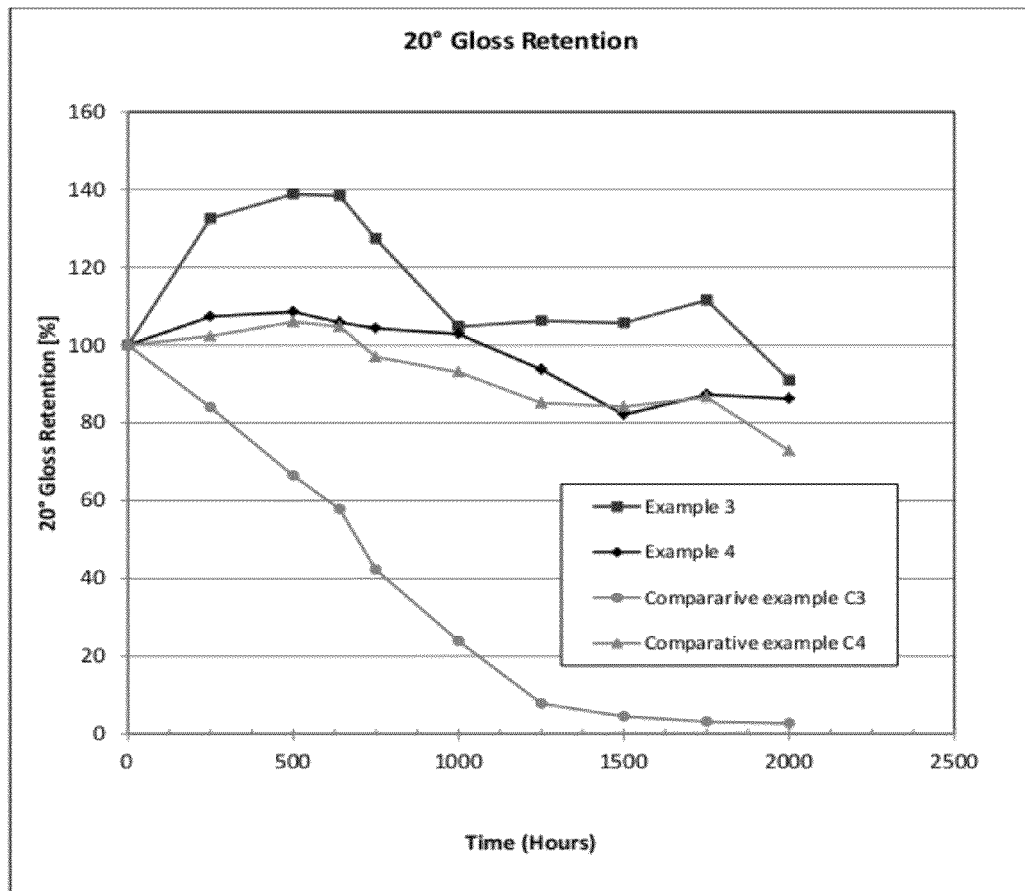
FIG. 4 illustrates results of a gloss retention test at 20°.
Figure 5:
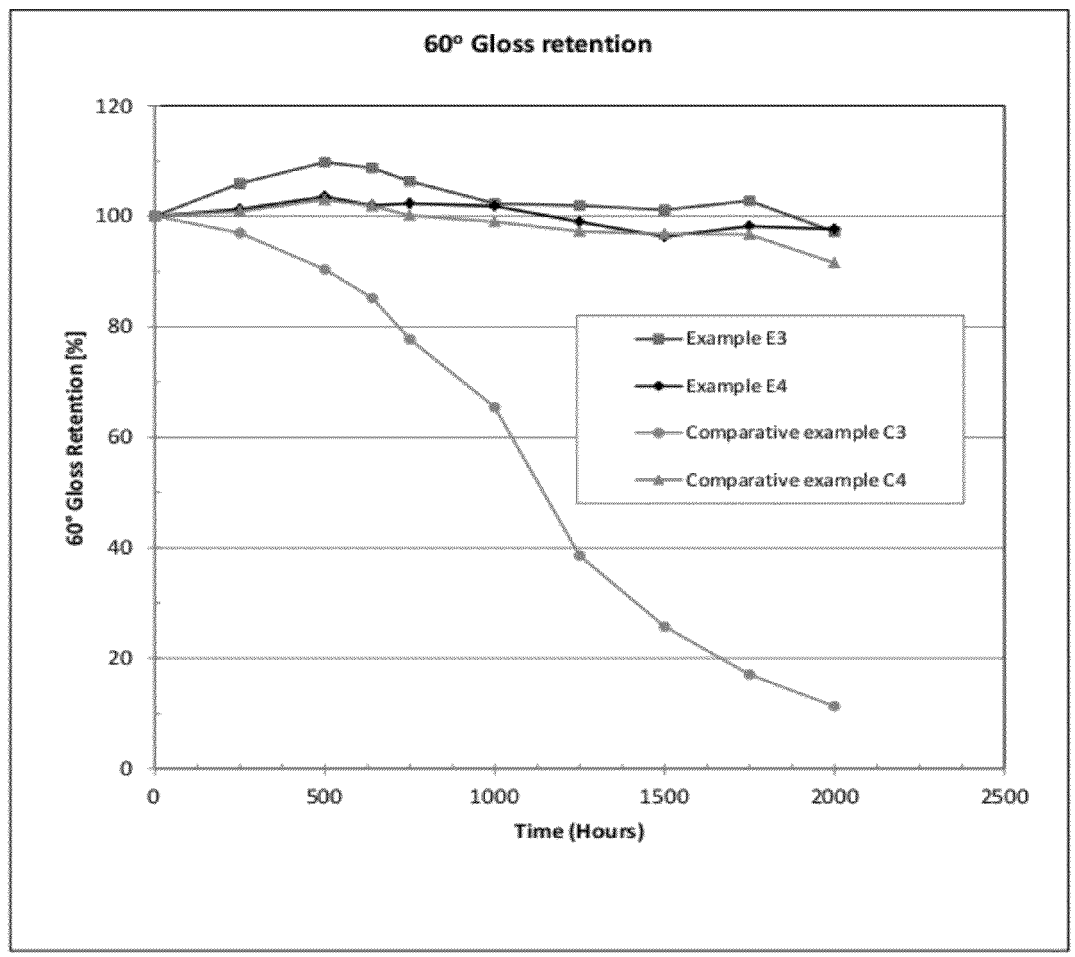
FIG. 5 illustrates results of a gloss retention test at 60°.

The panels prepared above were also subjected to QUVA (340 nm) accelerated weathering testing using a QUV/SE instrument (Q-Lab). The test conditions for "general metal" coatings per ASTM D 4587 was selected, that includes 4 hours of UV exposure at 60° C. followed by 4 hours condensation at 50° C. Test panel edges and backs were taped to protect against rust formation. Measurements were taken 2 hours into the UV light cycle to ensure a dry surface and consistency of measurement. Test panels were rotated after each observation interval. The coatings were tested for gloss retention (20° and 60° ASTM D 523) and color change (Hunter ΔE* and Yellowness Index, ASTM E 308 and ASTM D 1925). The results of the gloss retention at 20° are illustrated in FIG. 4 and the results of gloss retention at 60° are illustrated in FIG. 5.

After 2000 hours of exposure, comparative example C4 has shown drastic gloss losses. Polycarbonate based examples E3 and E4 have maintained 80% plus gloss retention for both 20° and 60° angles.

We claim:

1. A liquid thermosetting coating composition comprising an aliphatic polycarbonate resin and a cross linking compound, said aliphatic polycarbonate resin derived from aliphatic hydroxyl containing compounds in the presence of a catalyst, said aliphatic hydroxyl compounds comprising:
   A. 2,2,4,4-tetramethyl-1,3-cyclobutanediol (TMCD); and
   B. 1,4-cyclohexane dimethanol (CHDM); and
   wherein the catalyst used to obtain the aliphatic polycarbonate is present in an amount ranging from 0.0001 wt % to 0.03 wt % based on the total weight of the aliphatic hydroxyl compounds; and wherein molar ratio of TMCD to CHDM residues present in the polycarbonate resin is:
   (i) in the range of 8:2 to 3:7 if the only aliphatic hydroxyl compounds used are TMCD and CHDM or
   (ii) otherwise is in the range of 9:1 to 1:9.

2. The liquid composition of claim 1, wherein the polyhydroxyl compounds further comprise a third aliphatic polyhydroxyl compound different from TMCD and CHDM.

3. The liquid composition of claim 2, wherein the amount of third polyhydroxyl compound residue present in the polycarbonate resin is up to 50 mole % based on total residues of hydroxyl containing compounds.

4. The liquid composition of claim 3, wherein the third polyhydroxyl compound comprises neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-butyl-2-ethyl-1,3-propanediol, 2-ethyl-2-isobutyl-1,3-propanediol, 1,2-butanediol, 1,3-butanediol, 1,4-butanediol, 1,5-pentanediol, 1,6-hexanediol, 1,2-cyclohexanediol, 1,4-cyclohexanediol, 2-ethyl-1,3-hexanediol, 2,2,4,4-tetramethyl-1,6-hexanediol, thiodiethanol, 2,2,4-trimethyl 1,3-pentanediol, 2,4-diethyl-1,5-pentanediol, norbornene dimethanol, hydroxypivalyl hydroxypivalate, 1,10-decanediol, or hydrogenated bisphenol A.

5. The liquid composition of claim 4, wherein the third polyhydroxyl compound comprises 2-butyl-2-ethyl-1,3-propanediol (BEPD).

6. The liquid composition of claim 3, wherein the third polyhydroxyl compound comprises trimethylolethane, trimethylolpropane, hexanetriol, pentaerythritol, 1,2,4-cyclohexanetrimethanol, 1,3,5-cyclohexanetrimethynol or1,2,4,5-cyclohexanetetramethanol.

7. The liquid composition of claim 6, wherein the amount of the residues of said third aliphatic polyhydroxyl compound is up to 20 mole %, based on the total residues of polyhydroxyl compounds.

8. The liquid composition of claim 1, wherein the aliphatic polycarbonate is an amorphous solid or viscous liquid at about 25° C.

9. The liquid composition of claim 1, wherein the aliphatic polycarbonate is prepared by performing an ester exchange between a dialkyl carbonate, or alkylene carbonate, and units (A) and (B).

10. The liquid composition of claim 9, wherein the dialkyl carbonate comprises dimethylcarbonate or diethylcarbonate.

11. The liquid composition of claim 9, wherein the ester exchange reaction is performed by melt polymerization in the presense of said catalyst, said catalyst comprising an ester exchange catalyst.

12. The composition of claim 11, wherein the ester exchange catalyst comprises an alkali metal, alkali metal hydroxide, alkali metal alkoxide, alkali metal carbonate, alkaline earth metal carbonate, zinc borate, zinc oxide, lead silicate, lead carbonate, antimony trioxide, germanium dioxide, cerium trioxide, or aluminum isopropoxide.

13. The composition of any one of claims 1 and 2-12, wherein the amount of catalyst is from 0.001 wt. % to 0.03 wt %, based on the total weight of the aliphatic hydroxyl compounds employed.

14. The composition of claim 13, wherein the amount of catalyst is from 0.001 wt. % to 0.025 wt. %, based on the total weight of the aliphatic hydroxyl compounds employed.

15. The liquid composition of claim 1, wherein the crosslinker comprises a melamine compound or an isocyanate or isocyanurate compound.

16. The liquid composition of claim 1, wherein the crosslinker comprises hexamethoxymethylmelamine, tetramethoxymethylbenzoguanamine, tetramethoxymethylurea, mixed butoxy/methoxy substituted melamines, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, or isocyanate terminated adducts of diols and polyols.

17. The liquid composition of claim 1, wherein said composition comprises an un-pigmented transparent clear coat, a pigmented primer, a basecoat, or a topcoat.

* * * * *